Figure 1:
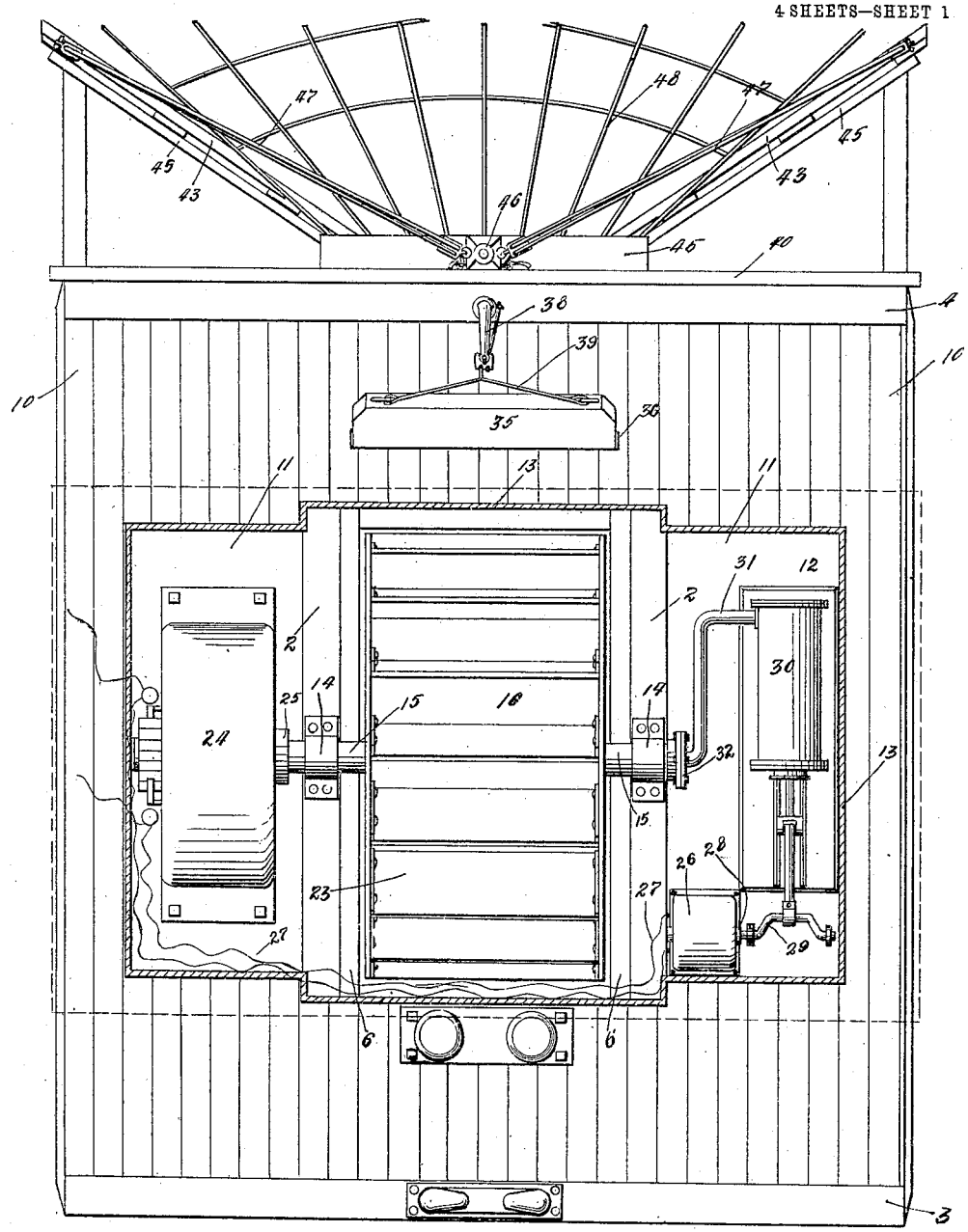

C. J. DUNCAN.
WATER MOTOR.
APPLICATION FILED NOV. 3, 1908.

938,989.

Patented Nov. 2, 1909.
4 SHEETS—SHEET 1.

Witnesses
R. L. Farrington.
R. H. Butler.

Inventor
C. J. Duncan,
By H. C. Evert & Co.
Attorneys

C. J. DUNCAN.
WATER MOTOR.
APPLICATION FILED NOV. 3, 1908.

938,989.

Patented Nov. 2, 1909.
4 SHEETS—SHEET 3.

Witnesses
R. L. Farrington.
O. H. Butler

Inventor
C. J. Duncan.
By H. C. Evert
Attorneys

C. J. DUNCAN.
WATER MOTOR.
APPLICATION FILED NOV. 3, 1908.

938,989.

Patented Nov. 2, 1909.
4 SHEETS—SHEET 4.

Witnesses
R. L. Farrington.
R. H. Butler

Inventor
C. J. Duncan.
By H. C. Everts
Attorneys

UNITED STATES PATENT OFFICE.

CLARK J. DUNCAN, OF WINDBER, PENNSYLVANIA.

WATER-MOTOR.

938,989.     Specification of Letters Patent.     Patented Nov. 2, 1909.

Application filed November 3, 1908. Serial No. 460,949.

*To all whom it may concern:*

Be it known that I, CLARK J. DUNCAN, a citizen of the United States of America, residing at Windber, in the county of Somerset and State of Pennsylvania, have invented certain new and useful Improvements in Water-Motors, of which the following is a specification, reference being had therein to the accompanying drawing.
This invention relates to water motors and the primary object of my invention is to provide a novel motor that can be utilized for generating power from movable bodies of water, such as rivers, canals, mountain streams, specially built conduits and by the waves of the ocean.

Another object of my invention is to provide a portable water motor having a novel self-sustained power wheel that can be easily actuated to impart a rotary movement to the armature shafts of motors or to the drive shafts of similar devices.

A further object of my invention is to provide a strong and durable structure through which water is adapted to flow for operating a bladed wheel, the flow of water being positively regulated, and foreign matter as debris, prevented from entering the structure and interfering with the operation of the bladed wheel.

A still further object of my invention is to provide a water motor that will not retard or interfere with the flow of water in streams or prevent the water from being used for other purposes.

A still further object of my invention is to provide a stationary water motor that can be advantageously used in mountain streams and canals for the generation of power that can be easily transmitted to shore.

The motor is constructed for rivers and the ocean, where the movement of water is continuous, comprising a structure that is suitably anchored in a river or ocean, while the motor that is used in connection with canals or specially built conduits comprises a stationary structure in which the same type of self-sustained wheel is used as in the motor employed in the ocean and rivers.

With the above and other objects in view which will more readily appear as the invention is better understood, the same consists in the novel construction, combination and arrangement of parts to be presently described and claimed.

Figure 2:
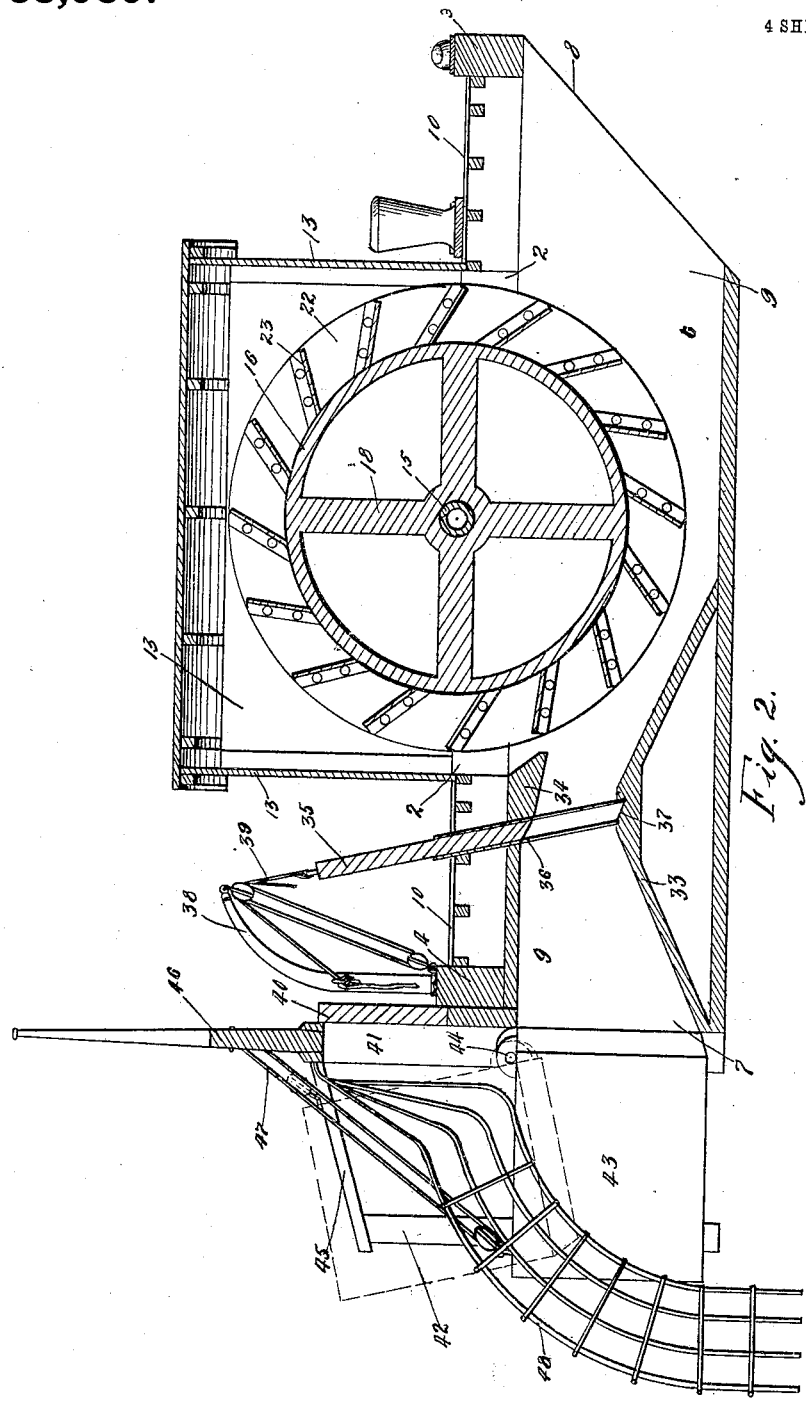
Figure 3:
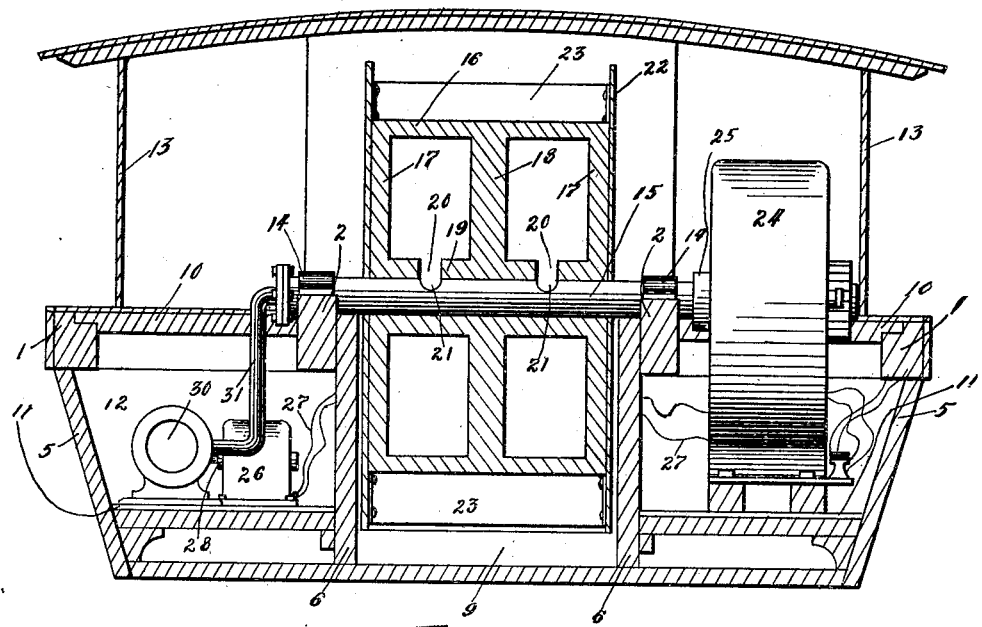
Figure 4:
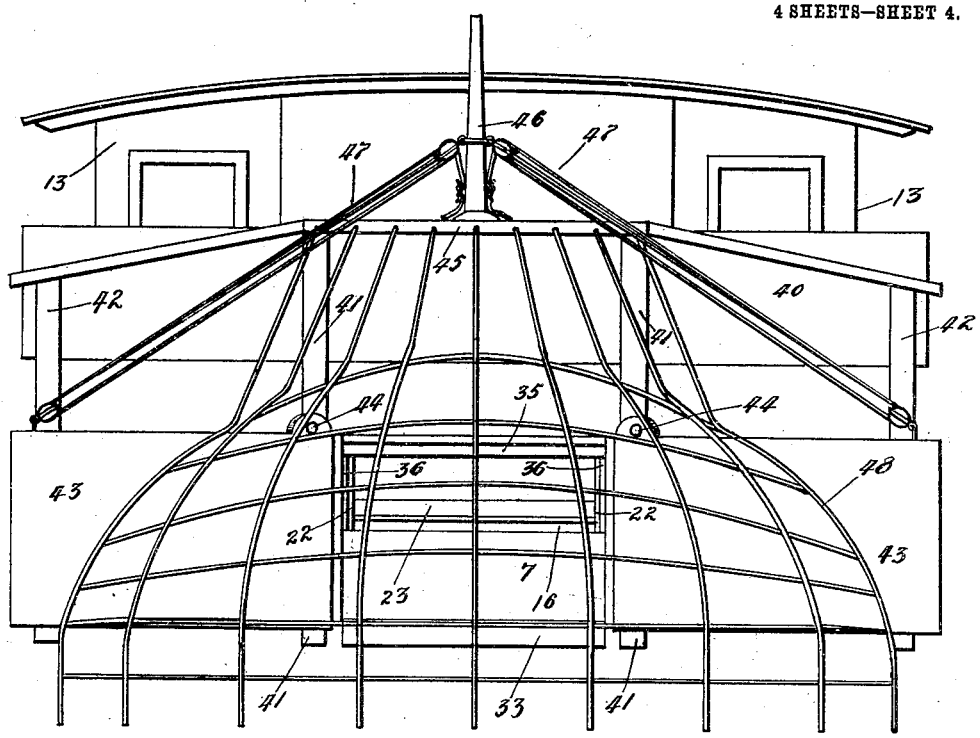
Figure 5:
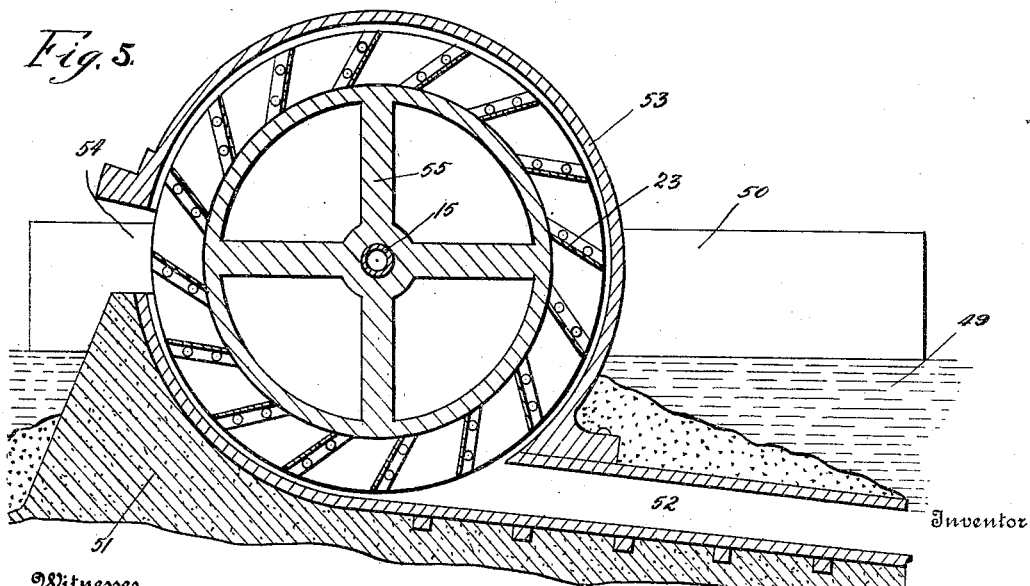

In the drawings:—Figure 1 is a plan of a water motor, Fig. 2 is a longitudinal sectional view of the same, Fig. 3 is a transverse sectional view, Fig. 4 is an end view of the motor, and Fig. 5 is a longitudinal sectional view of a stationary motor forming a modification of my invention.

To put my invention into practice, I provide a portable floating structure, comprising longitudinal beams 1 and 2 having their ends connected by transverse beams 3 and 4. The beams 1 and 4 are mounted upon the upper edges of a vessel 5, said vessel being provided with longitudinal vertical partitions 6, which in conjunction with openings 7 and 8 at the forward and rear ends of the vessel 5, form a water-way 9 through said vessel. The beams 1 and 2 support a floor or platform 10 having hatchways 11 formed therein, whereby easy access can be had to the hull 12 of the vessel 5 and the water-way 9 thereof. The hatchways 11 are covered by a suitable housing 13, for protecting the mechanism supported within the hull 12 of the vessel 5.

In lieu of the vessel 5 forming the floating structure of my motor, I can utilize two barges, and suitably lash and connect the same together to provide a central water-way, but the vessel 5 as above described constitutes the preferable form of construction.

The beams 2 intermediate the ends thereof are provided with bearings 14 for a transverse tubular shaft 15. Upon this shaft in the water-way 9 is mounted a self-sustained bladed wheel, comprising a cylindrical shell 16, end plates 17, spokes 18, and a hub 19, said hub having openings 20 formed therein communicating with openings 21 formed in the tubular shaft 15. Suitably secured to the end plates 17 are plates 22 of a greater diameter than the cylindrical shell 16, these plates supporting transverse blades 23, which are disposed tangentially relative to the cylindrical shell 16. While the body of the wheel is preferably made of a casting for providing an air tight compartment, the blades 23 are made detachable, whereby said blades can be easily renewed in connection with the wheel.

In the hull 12 of the vessel 5 at one side of the water-way is located an electric generator 24, this generator having the operating shaft thereof coupled to the tubular shaft 15, as at 25. Located in the hull 12 upon the opposite side of the water-way 9 is a motor 26, which is electrically connected to the generator 24 by wires 27. The armature shaft of the motor 26 is coupled, as at 28 to the crank shaft 29 of an air pump 30. This air pump is provided with an exhaust pipe 31, which is coupled, as at 32, to the tubular shaft 15, whereby a pressure of air can be at all times maintained within said shaft and within the bladed wheel.

The vessel 5 at the forward end of the water-way 9 is provided with a water deflector 33 for deflecting water upwardly as it enters the water-way, and with another deflector 34 for deflecting the same water downwardly in the water-way to impact against the blades 23 of the self-containing wheel. The deflectors 33 and 34 are arranged transversely of the water-way, and in conjunction with said deflectors, I use a gate 35 for controlling the passage of water through the water-way. The gate 35 is slidably mounted in guides 36 provided therefor at the sides of the water-way, said guides terminating upon the deflector 33, which is provided with a beveled seat 37 for the beveled lower edge of the gate 35. The transverse girder 4 is provided with a crane 38 in connection with which blocks and tackles 39 are used for raising and lowering the gate 35.

Upon the forward end of the vessel is mounted a transverse splash-board 40 having a depending post 41 at each side of the entrance to the water-way 9. The splash-board 40 is also provided with outwardly extending frames 42 serving functionally as braces for deflectors 43 pivotally connected, as at 44 to the post 41. The upper ends of the posts 41 are connected by a transverse beam 45 which is provided with a mast 46. Connected to the mast 46 and the outer ends of the deflectors 43 are blocks and tackles 47 for raising and lowering the outer ends of said deflectors.

Secured to the beam 45 is a cage or grating-like structure extending outwardly in front of the water-way for the purpose of preventing logs or debris from entering the water-way, clogging the same and injuring the self-sustaining bladed power wheel.

Assuming that the water motor has been conveniently anchored in a river, stream or ocean, the operation and utility of the motor are as follows: Water entering the water-way 9 of the vessel 5 impinges the blades 23 of the self-sustaining wheel with considerable force, causing said wheel to rotate and operate the electrical generator 24. The electricity generated by this generator is utilized for operating the motor 26 and any power in excess can be transmitted to the shore by electrical conduits and used for other purposes. In operating the air pump 30 of the motor 26 air is continuously forced into the bladed wheel and is adapted to make the same buoyant, whereby friction between the wheel and the bearings of the shaft 15 will be decreased and the efficiency of the wheel as a rotary power element increased.

The speed of the bladed power wheel is controlled by the gate 35 which regulates the flow of water through the water-way. If the motor is used in a mountain stream or river the deflectors 43 can be utilized for deflecting a large area of water toward the water-way, or in times of floods or a rise in the river or stream, the deflectors 43 can be elevated to allow a large quantity of water to pass by without entering the water-way 9.

Reference will now be had to Fig. 5 of the drawings, wherein I have illustrated my water motor in a stationary position as the same can be used in connection with a canal, specially constructed water conduit or similar water-way. The reference numeral 49 designates a body of water in which two abutments or break-waters 50 are constructed, and between these abutments or break-waters is constructed a dam 51 having an underground flume 52. Upon the down-side of the stream and communicating with the flume 52 is a cylindrical housing 53 supported between the abutments or break-waters 50. This cylindrical housing 53 at the crest of the dam 51 is opened, as at 54, whereby water flowing over the dam can enter said housing, pass through the flume 52 and assume its natural level upon the down-side of the stream. Journaled within the housing 53 is a self-sustaining bladed power wheel 55 similar to that shown in connection with the portable floating structure heretofore described. Upon the abutments or break-waters 50 can be arranged an electric generator motor and air pump for maintaining an air pressure in the wheel 55 and for generating power that can be used for other purposes.

While in the drawings forming a part of this application there is illustrated the preferred embodiments of my invention, it is to be understood that the same can be varied or changed as to shape, proportion and manner of assemblage without departing from the spirit of the invention.

Having now described my invention what I claim as new, is:—

1. A water motor comprising a vessel formed with a longitudinally extending water-way, a hollow shaft journaled transversely of said vessel, an air-tight shell mounted upon said shaft and positioned within said water-way and communicating with said shaft, tangentially disposed blades arranged upon the periphery of said shell and adapted to be impacted upon by the water passing through said water-way whereby said shell and shaft are revolved, and means driven from said shaft and communicating therewith for supplying water to said shell.

2. A water motor comprising a vessel formed with a longitudinally extending water-way, a hollow shaft journaled transversely of said vessel, an air-tight shell mounted upon said shaft and positioned within said water-way and communicating with said shaft, tangentially disposed blades arranged upon the periphery of said shell and adapted to be impacted upon by the water passing through said water-way whereby said shell and shaft are revolved, means driven from said shaft and communicating therewith for supplying water to said shell, and means supported by the vessel for regulating the passage of water through said water-way.

3. A water motor comprising a vessel formed with a longitudinally extending water-way, a hollow shaft journaled transversely of said vessel, an air-tight shell mounted upon said shaft and positioned within said water-way and communicating with said shaft, tangentially disposed blades arranged upon the periphery of said shell and adapted to be impacted upon by the water passing through said water-way whereby said shell and shaft are revolved, means driven from said shaft and communicating therewith for supplying water to said shell, means supported by the vessel for regulating the passage of water through said water-way, deflectors pivoted to said vessel and adapted to deflect the water into said water-way, and means carried by the vessel for raising and lowering said deflectors.

4. A water motor comprising a vessel formed with a longitudinally extending water-way, a hollow shaft journaled transversely of said vessel, an air-tight shell mounted upon said shaft and positioned within said water-way and communicating with said shaft, tangentially disposed blades arranged upon the periphery of said shell and adapted to be impacted upon by the water passing through said water-way whereby said shell and shaft are revolved, means driven from said shaft and communicating therewith for supplying water to said shell, means supported by the vessel for regulating the passage of water through said water-way, deflectors pivoted to said vessel and adapted to deflect the water into said water-way, means carried by the vessel for raising and lowering said deflectors, and means projecting from the forward end of the vessel to prevent entrance of obstructions to the water-way.

5. A water motor comprising a vessel having a longitudinally extending water-way, a shaft journaled in the vessel and extending transversely of the water-way, a self-contained shell connected to the shaft and positioned within the water-way, means whereby said shell is supplied with water, and a plurality of tangentially disposed blades arranged upon the periphery of said shell and adapted to be impacted upon by the passage of water through said water-way whereby said shaft is revolved.

6. A water motor comprising a vessel having a longitudinally extending water-way, a shaft journaled in the vessel and extending transversely of the water-way, a self-sustained shell connected to the shaft and positioned within the water-way, means whereby said shell is supplied with water, and a plurality of tangentially disposed blades arranged upon the periphery of said shell and adapted to be impacted upon by the passage of water through said water-way whereby said shaft is revolved, and a cage arranged at the forward end of said vessel for preventing the entrance of obstructions to said water-way.

In testimony whereof I affix my signature in the presence of two witnesses.

CLARK J. DUNCAN.

Witnesses:
   Max H. Srolovitz,
   John A. Hartman.